United States Patent
Dabrowski

(10) Patent No.: US 10,791,350 B2
(45) Date of Patent: Sep. 29, 2020

(54) SYSTEM AND METHOD FOR OPTIMIZATION OF VIDEO BITRATE

(71) Applicant: Advanced Digital Broadcast S.A., Eysins (CH)

(72) Inventor: Bartosz Dabrowski, Zielona Gora (PL)

(73) Assignee: Advanced Digital Broadcast S.A., Bellevue (CH)

(*) Notice: Subject to any disclaimer, the term of this patent is extended or adjusted under 35 U.S.C. 154(b) by 0 days.

(21) Appl. No.: 16/224,839

(22) Filed: Dec. 19, 2018

(65) Prior Publication Data

US 2019/0191196 A1    Jun. 20, 2019

(30) Foreign Application Priority Data

Dec. 19, 2017   (EP) .................................... 17208309

(51) Int. Cl.
| | | |
|---|---|---|
| H04N 21/2365 | (2011.01) | |
| H04N 21/2662 | (2011.01) | |
| G06T 7/194 | (2017.01) | |
| H04N 21/4728 | (2011.01) | |
| H04N 21/845 | (2011.01) | |
| H04N 21/235 | (2011.01) | |
| H04N 21/4402 | (2011.01) | |
| H04N 21/2343 | (2011.01) | |
| H04N 21/44 | (2011.01) | |
| H04N 21/234 | (2011.01) | |

(52) U.S. Cl.
CPC ....... *H04N 21/23655* (2013.01); *G06T 7/194* (2017.01); *H04N 21/2353* (2013.01); *H04N 21/2365* (2013.01); *H04N 21/23412* (2013.01); *H04N 21/234345* (2013.01); *H04N 21/2662* (2013.01); *H04N 21/44012* (2013.01); *H04N 21/440245* (2013.01); *H04N 21/4728* (2013.01); *H04N 21/8456* (2013.01)

(58) Field of Classification Search
CPC ....... H04N 21/23655; H04N 21/23412; H04N 21/44012; H04N 21/234345; H04N 21/440245; H04N 21/2365; H04N 21/2353; H04N 21/8456; H04N 21/4728; H04N 21/2662; G06T 7/194
See application file for complete search history.

(56) References Cited

U.S. PATENT DOCUMENTS

2012/0169923 A1* 7/2012 Millar .................... H04N 19/23
                                                348/399.1

* cited by examiner

Primary Examiner — Nam D Pham
(74) Attorney, Agent, or Firm — Mark M. Friedman

(57) ABSTRACT

A method for optimization of video bitrate of a given content, the method comprising the steps of: receiving (401) of a background data stream (102), having the lowest bitrate within a set of available streams for the given content and being created by compressing a complete source content (100) having the highest bitrate; starting reception (402) of a foreground data stream (101) wherein the video content of said foreground data stream (101) covers only a part of the complete source content (100) and has a higher bitrate than said lowest bitrate; verifying (403) whether it is possible to receive and present the foreground data stream (101) within a predefined threshold delay; presenting (404) a blended foreground data stream (101) on top of the background data stream (102).

11 Claims, 4 Drawing Sheets

SYSTEM AND METHOD FOR OPTIMIZATION OF VIDEO BITRATE

TECHNICAL FIELD

The present invention relates to a system and method for video content compression and streaming via a broadband communication channel such as the Internet. The present invention addresses a known problem of reducing content bit-rate while preserving best possible quality of the content itself.

BACKGROUND OF THE INVENTION

Existing solutions provide methods for reducing bit-rate (number of bits that are conveyed or processed per unit of time, typically 1 second) applying them mainly to video content, where bit-rates are relatively high and there is much room for improvement with respect to data compression.

Most solutions attempt at reduction of bit-rate of the whole video stream by using various motion picture compression methods e.g. utilizing MPEG-2 or H.264 or HEVC or the like.

Other solutions allow for more than one video stream, generated from the same, complete source content (resulting in reduced bitrate, the same source content), to be available for a receiver to select from depending on the conditions of the available communication link. Some streams utilize high bit-rate and some utilize low bit-rate. The receiver may select and present the low bit-rate stream when said conditions are poor and the high bit-rate stream when said conditions are good. Such method is used by a popular standard MPEG-DASH (Dynamic Adaptive Streaming over HTTP) or in a similar HTTP Live Streaming (HLS) solution known from prior art.

The aim of the present invention is a further optimization of video data compression in order to achieve lower bit-rates while maintaining subjective content quality.

SUMMARY AND OBJECTS OF THE PRESENT INVENTION

An object of the present invention is a method for optimization of video bitrate of a given content, the method being characterized in that it comprises the steps of: receiving a background data stream, having the lowest bitrate within a set of available streams for the given content and being created by compressing a complete source content having the highest bitrate; starting reception of a foreground data stream wherein the video content of said foreground data stream covers only a part of the complete source content and has a higher bitrate than said lowest bitrate; verifying whether it is possible to receive and present the foreground data stream within a predefined threshold delay and if it is: blending the foreground data stream on top of the background data stream.

Preferably, the method further comprises the steps of: starting reception of the complete source content; verifying whether it is possible to receive and present the complete source content within a predefined threshold delay; outputting the complete source content.

Preferably, the method further comprises the steps of monitoring the connection and reception parameters and in case it is not possible to receive and present the complete source content within a predefined threshold delay, returning to the first verification step.

Preferably, there are available supplementary data streams, in addition to the background data stream and the foreground data stream, which are to be tested for retrieval, and retrieved for presentation according to blending information data wherein each of the supplementary data streams covers only a part of the complete source content.

Preferably, a blending information is retrieved on request of the receiver or available via MPEG private sections wherein said blending information comprises a sequence of blending said streams.

Preferably, said blending information further comprises information on an alpha channel determining opacity of each pixel or group of such.

Another object of the present invention is a computer program comprising program code means for performing all the steps of the computer-implemented method according to the present invention when said program is run on a computer.

Another object of the present invention is a computer readable medium storing computer-executable instructions performing all the steps of the computer-implemented method according to the present invention when executed on a computer.

Another object of the present invention is an encoder for optimization of video bitrate of a given content, the encoder being characterized in that it comprises: a reception means configured to receive a complete source content and buffer it in a memory buffer according to specified parameters; a segmentation module configured to create a background data stream by a background stream generator and a foreground stream by a foreground stream generator; wherein the background stream, has the lowest bitrate within a set of available streams for the given content and being created by compressing the complete source content having the highest bitrate and the foreground stream wherein its content covers only a part of the complete source content and has a higher bitrate than said lowest bitrate; a multiplexer configured to deliver selected data streams to a receiver according to its requirements communicated to the encoder via a communication means; wherein a controller is configured to control said reception means, said segmentation module and said multiplexer.

Preferably, one or more supplementary streams are segmented from complete source content in a supplementary streams generator wherein each of the supplementary data streams covers only a part of the complete source content.

Preferably, the segmentation module is further configured to generate a blending information identifying a sequence of all available streams in a defined order.

Preferably, wherein the blending information is provided via MPEG private sections.

BRIEF DESCRIPTION OF THE DRAWINGS

These and other objects of the invention presented herein, are accomplished by providing a system and method for optimization of video bitrate. Further details and features of the present invention, its nature and various advantages will become more apparent from the following detailed description of the preferred embodiments shown in a drawing, in which.

NOTATION AND NOMENCLATURE

Figure 1:
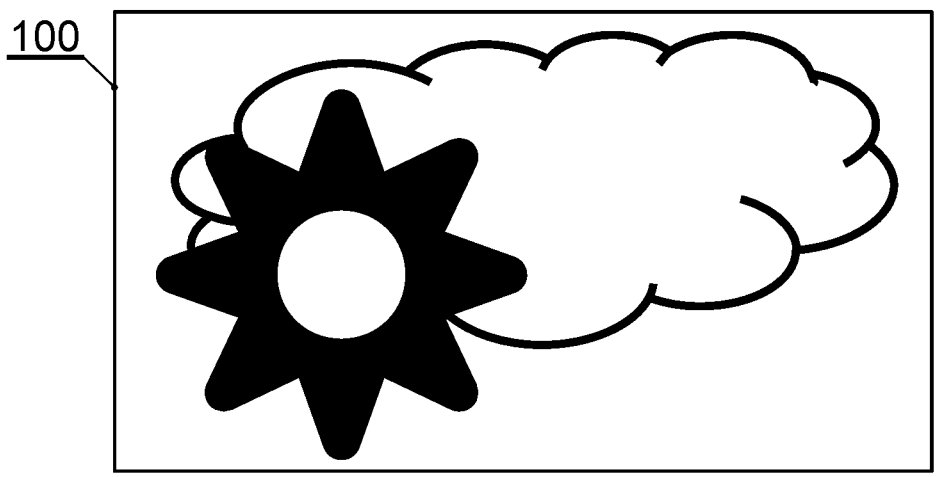
FIG. 1 presents the original high bit rate high quality video stream (represented as a single frame)
Figure 2:
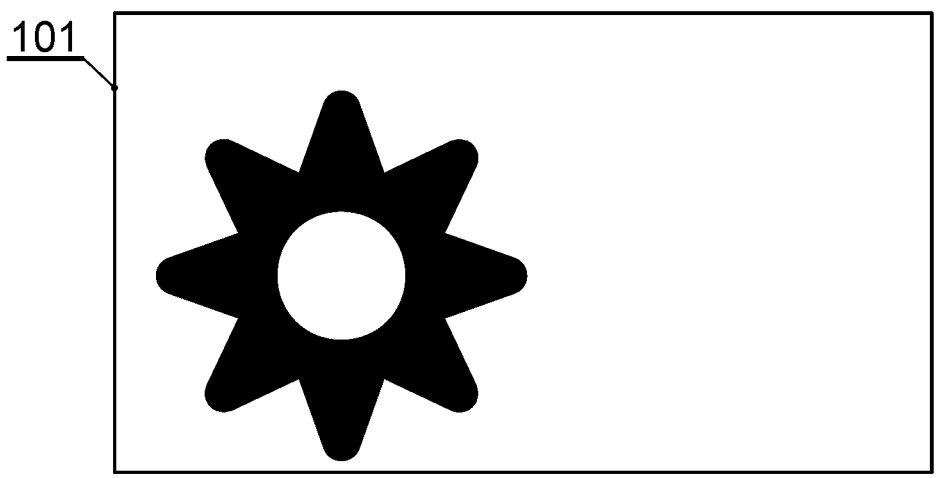
FIG. 2 presents the stream of FIG. 1 transformed into the foreground and the background (represented as a single frame)
Figure 2:
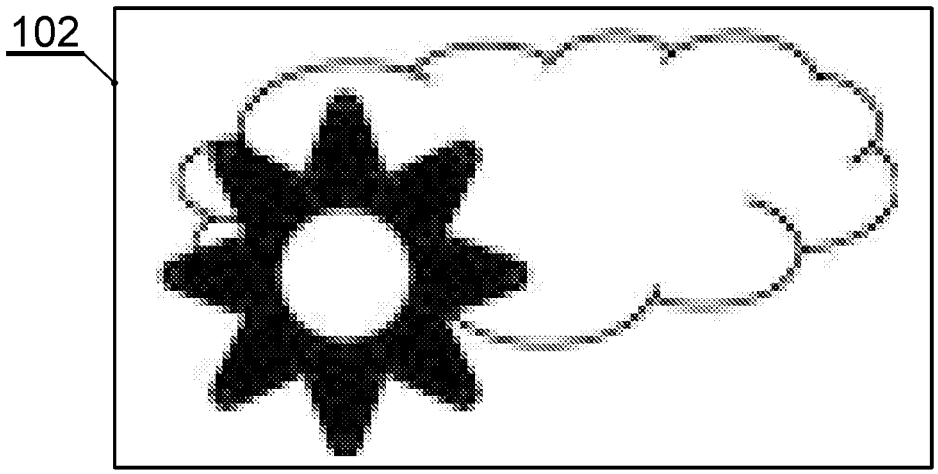
Figure 3:
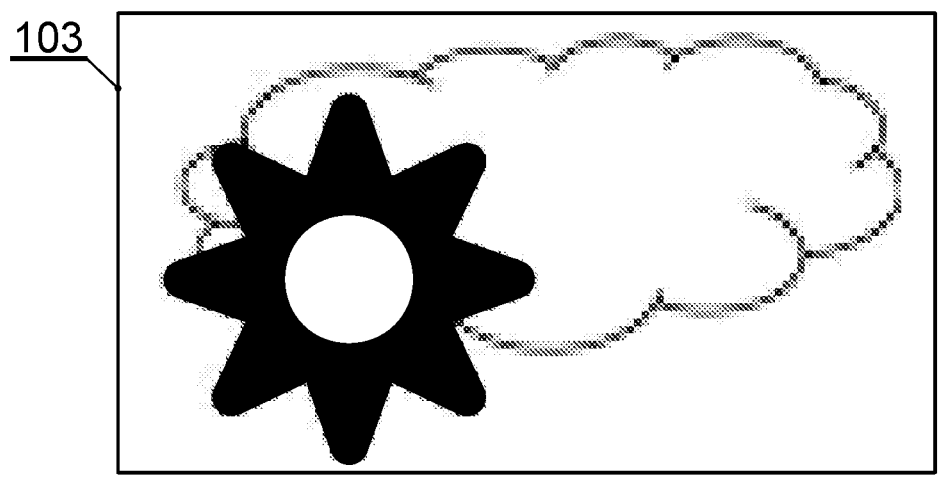
FIG. 3 presents the foreground and the background blended for presentation (represented as a single frame)

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

As utilized herein, the term "example" means serving as a non-limiting example, instance, or illustration. As utilized herein, the terms "for example" and "e.g." introduce a list of one or more non-limiting examples, instances, or illustrations.

DESCRIPTION OF EMBODIMENTS

The present invention relates mainly to video content being streamed via a communication link i.e. sent and subsequently presented. However, it will become apparent, to one skilled in the art, that this may also be applied to and relate to any bit stream being sent between two points via a variety of media.

The method disclosed herein comprises the following general steps:
- division of the input data stream into at least two components: a background and a foreground component and making these components available to a receiver; and
- selection of at least one component to transmit and blend for presentation the selection being performed by the receiver and
- transmitting the selected components to a recipient/receiver; and
- blending (according to a predefined or tailored method) of the selected components for presentation.

The present invention is best described by exemplary embodiments that follow.

One exemplary embodiment of the present invention is a method of optimization of bit rate of a video stream comprising moving pictures.

The method allows for transforming a given video stream into at least two video streams. The first of the at least two video streams is called the foreground hereinafter and the second of the at least two video streams is called the background hereinafter. The remaining streams may be called supplementary streams.

Each of the streams is encoded using at least one selected bit rate i.e. it is encoded in such a manner that the target bit rate of the streams is substantially close to the selected bit rate. A skilled person will notice that different methods, e.g. different codecs, may be used to achieve this goal. A skilled person will also appreciate that the same selected bit rate may result in different quality of the resulting stream depending on the method e.g. codec used. Nevertheless, quality may be subjective while bitrate is an objective term, which makes its use more universal.

An exemplary content of such a video data stream (100), having the highest bitrate within the set of the processed data streams (100, 101, 102), is depicted in FIG. 1. The original, complete high bit rate stream (100) is encoded using a high target bit rate (e.g. a full HD video may have bit rate of up to 5 Mb/s), meaning also that it requires a high quality connection between the transmitter and the receiver, to be sent and presented without delay.

The stream is transformed into two data streams (101) and (102) in this example. The stream (102) is the same stream as the original high bit rate stream (100) only encoded using a low (e.g. 500 kb/s or lower) target bit rate also meaning that a low quality/bandwidth connection between the transmitter and the receiver is sufficient for it to be sent and presented without delay. This data stream (102) comprises the background.

The present embodiment presents the background as a whole stream. This is caused by the background data stream (102) being selectable for both the purpose of presentation on a low quality connection and for the purpose of blending with the data stream (101) which is defined below. However, a skilled person will appreciate that the present method may be adapted to a situation where an additional background stream is available and covers only those areas of presentation that are not covered in the data stream (101).

The aforementioned high quality connection means a connection over which it is possible to transmit the high bit rate stream (100) without delay to its presentation (e.g. within a predefined threshold delay). An exemplary value of high bit rate is 5 Mb/s over mobile LTE, which is typically enough to transmit a full HD video encoded using the H.264 codec.

The term without delay is to be understood as allowing presentation of content within a predefined threshold delay (typical for a given device, e.g. local buffering period) and once the presentation has begun, it is not disturbed—meaning stopped or paused or deformed or the like due to too low quality of the connection.

The aforementioned low quality connection means a connection over which it is not possible to transmit the high bit rate stream (100) without delay to its presentation. An exemplary value is 1 Mb/s over mobile LTE which is typically enough only to transmit a low resolution e.g. 576i video but not enough e.g. for the aforementioned full HD video.

The data stream (101) is a sub-stream of the original high bit rate stream (100), meaning that data representing video covering only a part of the original video of the high bit rate stream (100) is included in the stream (101). Typically, this data will include the first plan of the motion picture or the more contrasting elements or the like.

It is in no way limiting to the present invention how the foreground is selected. It may be an arbitrary shape or adjusted per frame, per object present in the video content (e.g. a car, a person etc.) or the like. Different segmentation techniques may be employed in order to select a foreground or otherwise key object in a given video frame or a sequence of frames. One exemplary segmentation technique is an arbitrary rectangular area identified by a human as most active for the considered motion picture. Another exemplary segmentation technique is selection of a circular area per each frame so that inside of the circular area contains portion of the frame with highest contrast value.

A skilled person will notice that the stream (101) will keep its original quality if its target bit rate is lower than the one of the original high bit rate stream (100). This is due to the fact that stream (101) contains substantially less data than stream (100). Therefore, it will typically utilize lower bit rate if the same encoding technique is used. Hence, the stream (101) requires a connection of a substantially lower bandwidth to send and present without delay than the original high bit rate stream (100) does.

The final stream may be blended directly before presentation in such a way that for a single frame first the background is drawn and then the foreground is drawn on top of the background. This provides the benefit of presenting the key elements of the motion picture in high quality while reducing the overall bit rate needed to send the content stream.

A skilled person will appreciate that it is possible to select the foreground and target bit rates of the foreground (101) and the background (102) data streams so that all the following statements are true:

The bit rate of the background (102) is preferably substantially lower than the bit rate of the original high bit rate stream (100);

The bit rate of the foreground (101) is preferably close to the bit rate of the original high bit rate stream (100) or the bit rate of the foreground is substantially higher than the bit rate of the background (102).

The combined bit rate of both streams (101) and (102) is preferably substantially lower than the bit rate of the original high bit rate stream (100).

Another embodiment of the present invention is a method according to the first embodiment where the foreground data stream (101) carries additional blending information. Exemplary blending information comprises an alpha channel determining opacity of each pixel or group of such or the like. This information is taken into account when blending the final picture for presentation. Typically, the alpha channel will be used to make the foreground partially opaque in order to smooth the transition areas between the foreground and the background.

The blending information may be retrieved on request or sent to every receiver, for example as MPEG private sections.

Another extension, of the aforementioned alpha channel, is information about the sequence of blending of the streams. In such case, the transmitter/encoder device includes the blending sequence in the stream and the receiver device may use this information to blend a subset of all the available streams in a defined order (for example according to bitrate).

Figure 4:
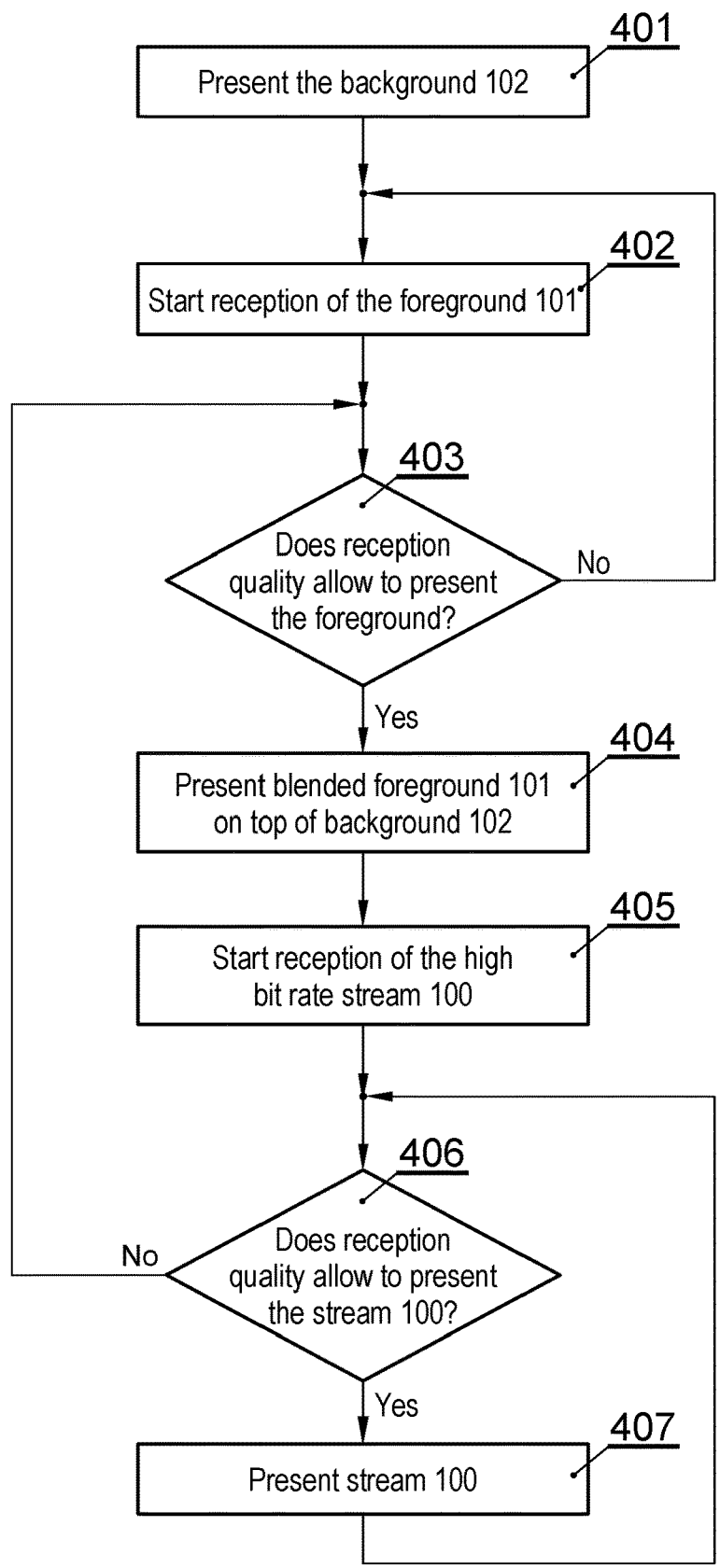
FIG. 4 presents the method of selection of a stream or streams for presentation.

Another embodiment of the present invention is a method (400) according to FIG. 4. The method may be used to adaptively select the available streams to be sent by a transmitter and presented, by a receiver, in order to optimally use the available connection between the transmitter and receiver. The method is a variation of the widely known MPEG-DASH standard (ISO/IEC 23009-1:2012). The available streams are assumed to be prepared according to the previous embodiments.

The method (400) begins at step (401) with reception for subsequent presentation of a background data stream (102).

The background data stream (102) may be retrieved based on information present in said blending information data or be retrieved based on other information available in the content.

The background (102) is the stream with the smallest bit rate (within the set of available streams for a given content) and therefore it is most probable that it will be received and presented without delay. Next, at step (402) the method starts reception of the foreground data stream (101). The stream is not presented at this step. If, at step (403), it is verified whether it is possible to receive and present the foreground data stream (101) without delay (or otherwise whether it is possible within a predefined threshold delay), the method moves to step (404).

Otherwise, the method moves to step (402) to keep checking the possibility to present the foreground data stream (101).

Subsequently, at step (404), the method presents a blended foreground data stream (101) on top of the background (102). Next, reception of the original high bit rate stream (100) is started. A skilled person will appreciate that although it would be enough to know some quantitative quality of the connection e.g. its speed to determine if the reception of the high bit rate stream is possible, it is better to start the reception thereof as it provides the desired information 'in place' i.e. by mere action of reception of the stream the receiver device knows whether the speed of the reception is sufficient.

The method moves on to step (406), where, similarly to step (403), it is verified whether it is possible to receive and present the original high bit rate stream (100) without delay. If it is possible, the method moves to step (407) and presents (or otherwise outputs for presentation) the original high bit rate stream (100).

If, at step (406), it is not possible to receive and present the original high bit rate stream (100), i.e. the base stream, without delay, the method moves to step (403) to continue monitoring for other possibilities of presentation. After step (407), the method moves to step (406) in order to continue monitoring the connection (reception parameters) and possibly fall back to lower bit rate if respective conditions at steps (406) and (403) fail.

A skilled person will appreciate that some details of the described method may be changed without limiting the scope of the present invention. For example, the step (401) of method (400) may select different configuration e.g. such as the one of step (404) of the same method. A skilled person will then easily adopt the present method to the new first step.

A skilled person will also appreciate that more levels of division or transformation of the stream are possible e.g. more foreground levels may be created. The foreground levels may overlap or not or more backgrounds may be created and any combination thereof may be used to adopt the cumulative bit rate of the blended streams to best use the available connection quality.

Figure 5:
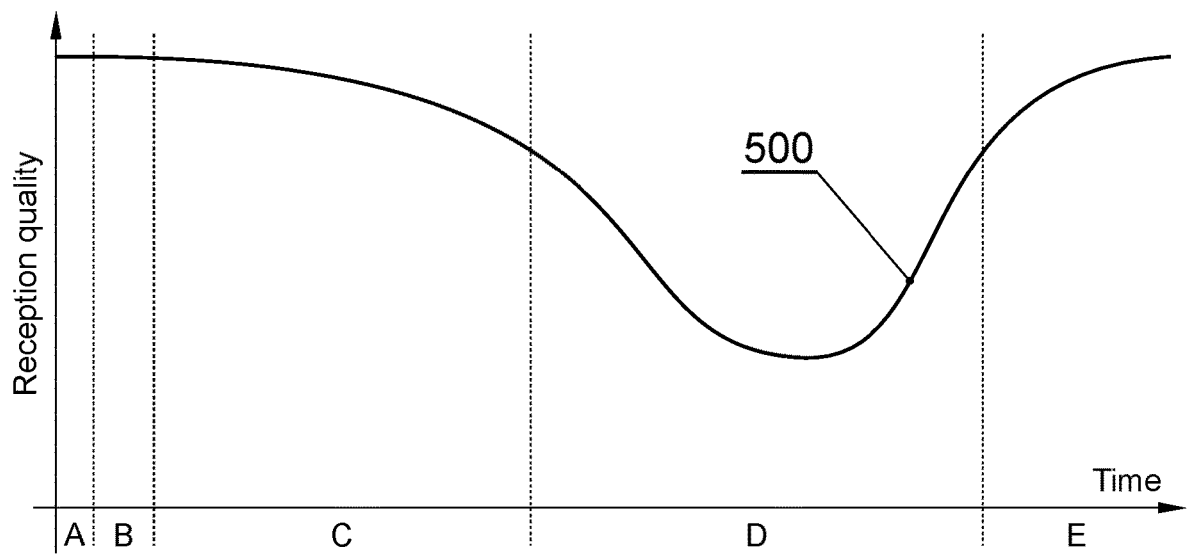
FIG. 5 presents a time diagram showing selection of streams.

FIG. 5 presents a time diagram showing selection of streams according to the present invention. The figure presents an exemplary time diagram depicting the quality of reception of the streams. The line (500) shows how the reception quality (in particular such quality may be considered as throughput) changes over time. It is apparent, to a one skilled in the art, that the units of the axes or the scale of the diagram i.e. the quantitative dependencies are not relevant to the qualitative dependency presented therein.

The exemplary data reception bitrate flow (500) on the diagram depicts a time span A, which begins with step (401) of the method (400) and ends with step (405) of the method (400).

Time span B depicts a time of presentation of both blended streams (101) and (102) and a time span C depicts a time when reception quality is good enough to present the original high bit rate stream (100).

Typically, the implementation of the method (400) will attempt to minimise time spans A and B, if allowed by reception quality.

Time span D depicts a time when the quality of reception drops to an extent where presentation of the original high bit rate stream (100) is not possible, thus the method presents the blended streams (101) and (102).

Time span E depicts a time when reception quality is again high and the original high bit rate stream (100) may be presented. The diagram of FIG. 5 shows the advantage provided by the present invention being that instead of switching of presentation to a low quality stream (102), the presentation retained high quality of stream (101) in the most important area of the foreground.

Optionally, there are available supplementary data streams, in addition to the background data stream (102) and the foreground data stream (101), which are to be tested for retrieval, and retrieved for presentation according to blending information data. It is clear that such supplementary data streams verification and retrieval may be added to the method of FIG. 4. Similarly, to the foreground data stream (101), each of the supplementary data streams covers only a part of the complete source content (100). Preferably, these distinct parts do not overlap, but overlapping is allowed.

In such case, the blending information data may comprise an order of data streams testing and retrieval, which may be organized according to different techniques such as sorting according to bitrate increment between two data streams.

Figure 6:
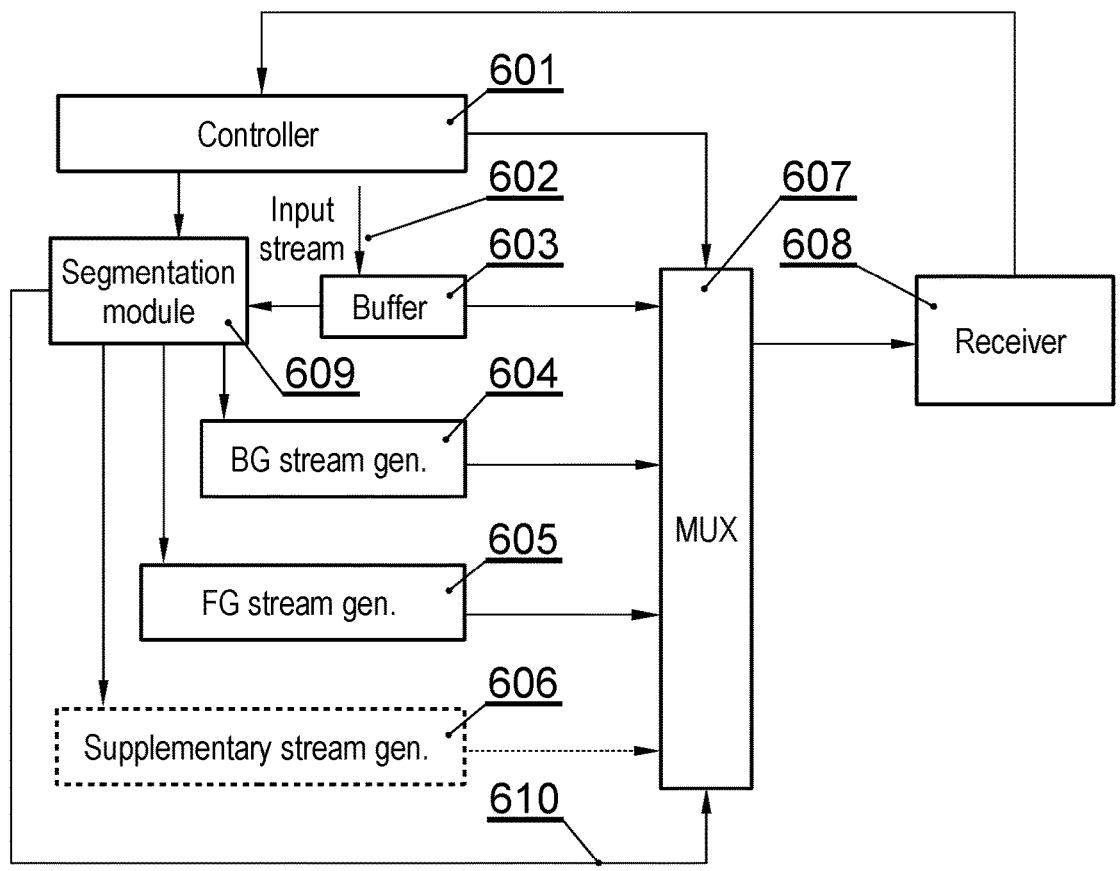
FIG. 6 depicts a system according to the present invention.

FIG. 6 depicts a system according to the present invention, which is managed, on the transmission side by a controller (601). The system may comprise an encoder in general and a receiver (608). The encoder receives the original high bit rate stream (100) via a suitable reception means (602) and buffers it in a memory buffer (603) according to specified parameters.

Further, the controller (601) may instruct a segmentation module (609) to create the background data stream (102) by a background stream generator (604) and a foreground stream (101) by a foreground stream generator (605) according to the aforementioned description.

Additionally, one or more supplementary streams may be segmented from the original high bit rate stream (100) in a supplementary stream(s) generator (606).

The segmentation module (609) may also generate the aforementioned blending information (610) since it is aware of the applied segmentation.

A multiplexer (607) is configured to deliver selected data streams to a receiver (608) according to its requirements communicated to the controller (601) via a suitable communication means.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system".

Furthermore, the present invention may take the form of a computer program product embodied in any tangible medium of expression having computer usable program code embodied in the medium.

It can be easily recognized, by one skilled in the art, that the aforementioned method for optimization of video bitrate may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A method for optimization of video bitrate of a given content, the method being characterized in that it comprises the steps of:
   receiving (401) a background data stream (102), having the lowest bitrate within a set of available streams for the given content and being created by compressing a complete source content (100) having the highest bitrate;
   starting reception (402) of a foreground data stream (101) wherein the video content of said foreground data stream (101) covers only a part of the complete source content (100) and has a higher bitrate than said lowest bitrate;
   verifying (403) whether it is possible to receive and present the foreground data stream (101) within a predefined threshold delay and if it is:
   blending (404) the foreground data stream (101) on top of the background data stream (102).

2. The method according to claim 1 wherein the method further comprises the steps of:
   starting reception of the complete source content (100);

verifying (406) whether it is possible to receive and present the complete source content (100) within a predefined threshold delay;

outputting (407) the complete source content (100).

3. The method according to claim 1 wherein the method further comprises the steps of:

monitoring the connection and reception parameters and in case it is not possible to receive and present the complete source content (100) within a predefined threshold delay, returning to the first verification step (403).

4. The method according to claim 1 wherein there are available supplementary data streams, in addition to the background data stream (102) and the foreground data stream (101), which are to be tested for retrieval, and retrieved for presentation according to blending information data wherein each of the supplementary data streams covers only a part of the complete source content (100).

5. The method according to claim 1 wherein a blending information is retrieved on request of the receiver or available via MPEG private sections wherein said blending information comprises a sequence of blending said streams.

6. The method according to claim 5 wherein said blending information further comprises information on an alpha channel determining opacity of each pixel or group of such.

7. A non-transitory computer readable medium storing computer-executable instructions performing all the steps of the computer-implemented method according to claim 1 when executed on a computer.

8. An encoder for optimization of video bitrate of a given content, the encoder being characterized in that it comprises:

a reception means (602) configured to receive a complete source content (100) and buffer it in a memory buffer (603) according to specified parameters;

a segmentation module (609) configured to create a background data stream (102) by a background stream generator (604) and a foreground stream (101) by a foreground stream generator (605);

wherein the background stream (102), has the lowest bitrate within a set of available streams for the given content and being created by compressing the complete source content (100) having the highest bitrate and the foreground stream (101) wherein its content covers only a part of the complete source content (100) and has a higher bitrate than said lowest bitrate;

a multiplexer (607) configured to deliver selected data streams to a receiver (608) according to its requirements communicated to the encoder via a communication means;

wherein a controller (601) is configured to control said reception means (602), said segmentation module (609) and said multiplexer (607).

9. The encoder according to claim 8 wherein one or more supplementary streams are segmented from complete source content (100) in a supplementary streams generator (606) wherein each of the supplementary data streams covers only a part of the complete source content (100).

10. The encoder according to claim 9 wherein the segmentation module (609) is further configured to generate a blending information (610) identifying a sequence of all available streams in a defined order.

11. The encoder according to claim 10 wherein the blending information is provided via MPEG private sections.

* * * * *